United States Patent [19]
Adams et al.

[11] Patent Number: 5,944,160
[45] Date of Patent: Aug. 31, 1999

[54] DRIVE UNIT WITH A HYDRODYNAMIC RETARDER AND TRANSMISSION

[75] Inventors: Werner Adams, Crailsheim; Peter Edelmann, Heidenheim; Jurgan Friedrich; Peter Heilinger, both of Crailsheim; Peter Rose, Heidenheim; Klaus Vogelsang, Crailsheim, all of Germany

[73] Assignee: Voith Turbo GmbH & Co. KG, Heidenheim, Germany

[21] Appl. No.: 08/753,668

[22] Filed: Nov. 27, 1996

[30] Foreign Application Priority Data

Nov. 28, 1995 [DE] Germany ............... 195 44 189

[51] Int. Cl.⁶ .................................................... B60T 1/087
[52] U.S. Cl. .................. 192/216; 188/296; 74/411.13
[58] Field of Search ................... 192/4 B, 216, 192/12 A; 188/296; 74/411.13

[56] References Cited

U.S. PATENT DOCUMENTS

| | | | |
|---|---|---|---|
| 3,297,114 | 1/1967 | Erdman | 188/90 |
| 3,367,461 | 2/1968 | Nagel | 192/35 |
| 3,572,480 | 3/1971 | Nagel | 192/4 B |
| 3,650,358 | 3/1972 | Bessiere | 188/296 |
| 3,882,975 | 5/1975 | Jedlitschka et al. | 192/4 B X |
| 4,235,320 | 11/1980 | Polak et al. | 192/4 B |
| 4,405,038 | 9/1983 | Ternehall | 192/4 B |
| 4,884,669 | 12/1989 | Ehrlinger | 192/4 B |

FOREIGN PATENT DOCUMENTS

| | | |
|---|---|---|
| 1575798 | 1/1970 | Germany . |
| 1946167 | 3/1970 | Germany . |
| 2536805 | 2/1977 | Germany . |
| 8613508 | 7/1986 | Germany . |
| 195 09 417 | 6/1996 | Germany . |

*Primary Examiner*—Charles A. Marmor
*Assistant Examiner*—Saúl Rodriguez
*Attorney, Agent, or Firm*—Baker & Daniels

[57] ABSTRACT

A drive unit for a motor vehicle having an engine; a transmission featuring a transmission housing; and a retarder featuring a rotor and a stator. A retarder shaft is provided that is supported by two bearings which are offset along the axial length of the retarder shaft. At least one of the bearings ("outside bearing") is supported by a wall ("outside wall") of the transmission housing. The retarder shaft protrudes freely beyond the outside wall of the transmission housing. Disposed on the retarder shaft, outside the outer bearing, on the outside wall, is a sealing component. The sealing component seals the clearance between the retarder (or pinion) shaft and the outside wall, preventing passage therethrough of the transmission oil and the operating medium of the retarder.

9 Claims, 2 Drawing Sheets

DRIVE UNIT WITH A HYDRODYNAMIC RETARDER AND TRANSMISSION

BACKGROUND OF THE INVENTION

The present invention concerns a drive unit for a motor vehicle having an engine, a hydrodynamic retarder and a transmission.

In vehicle drive systems, retarders play an ever more important role. Used in the motor vehicle, and also in systems with greatly changing operation, the retarder is turned on and off by charging the impeller-equipped working circuit with an operating medium and by draining it. Examples of suitable operating mediums are oil and water. When the retarder is engaged in braking action, the operating medium heats up. The heat must be removed by a radiator.

Drive units of motor vehicles normally include additional units that require cooling. The engine, the mechanical brakes, the clutch and the transmission are examples of such additional units. These other units may also feature a cooling circuit. It is known to operate the retarder in an automotive drive system with water which also serves as a coolant. In nonbraking operation, the retarder can be used selectively as a pump, and the operating medium of the retarder may, at the same time, serve as cooling medium for other units of the drive assembly.

DE 195 09 417 A1 shows and describes a drive train for a motor vehicle comprising an engine, a transmission and a retarder. The retarder is integrated in the end section of the transmission housing.

The objective underlying the present invention is to improve such a drive train to economize and simplify the manufacture and assembly of retarder and transmission to produce a less expensive retarder and transmission.

SUMMARY OF THE INVENTION

The objective of the present invention is met by utilizing a drive train having an engine, transmission and hydrodynamic retarder having a rotor and a stator wherein a retarder shaft extends through the housing of the transmission and a sealing component provides a seal between the retarder shaft and the transmission housing whereby the lubricant of the transmission remains separated from the operating medium of the hydrodynamic retarder.

Differing from the prior art, the present invention provides an arrangement whereby the retarder can be slipped on the retarder shaft as an independent module. The retarder shaft is fitted in a wall part that is an integral part of the transmission housing. The retarder shaft is supported in this wall part and protrudes beyond it, so that a completely preassembled retarder can be slipped-on the retarder shaft. Additionally, a packing is integrated in the said wall part. The packing serves a dual function: for one, it provides a seal against the transmission oil and, for another, it provides a seal against the operating medium of the retarder. The retarder can be operated with an operating medium other than oil in which case it is necessary to ensure that the two mediums, namely the operating medium of the retarder, on the one hand, and the lubricant of the transmission, on the other hand, are not in conducting connection with each other. This is accomplished with the packing. Naturally, this does not preclude the use of identical mediums, thus, the retarder may also be operated with oil as an operating medium.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
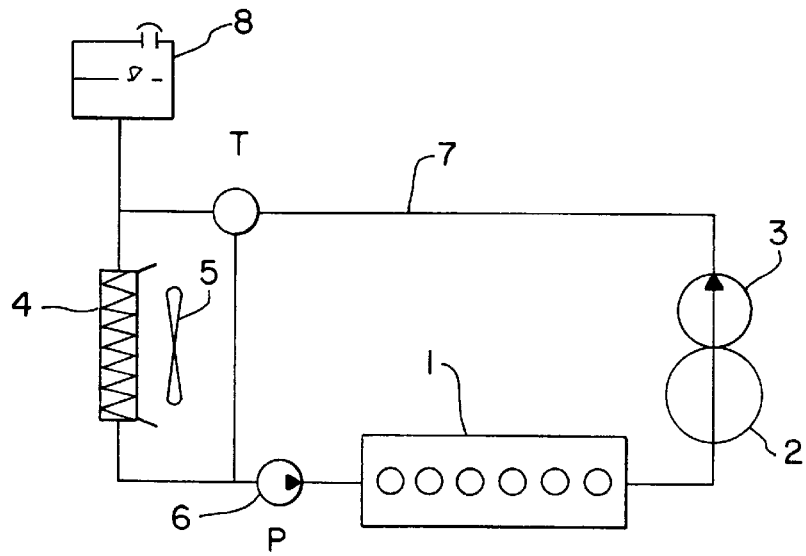
FIG. 1 is a schematic view of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner. The embodiment disclosed below is not intended to be exhaustive or limit the invention to the precise form disclosed in the following detailed description.

DESCRIPTION OF THE PRESENT INVENTION

FIG. 1 shows schematically a drive train comprising an engine 1, transmission 2, hydrodynamic retarder 3 with a coolant as operating medium 10, a heat exchanger 4, a fan 5 coordinated with it, a circulation pump 6, cooling water lines 7 and an equalizing tank 8.

Figure 2:
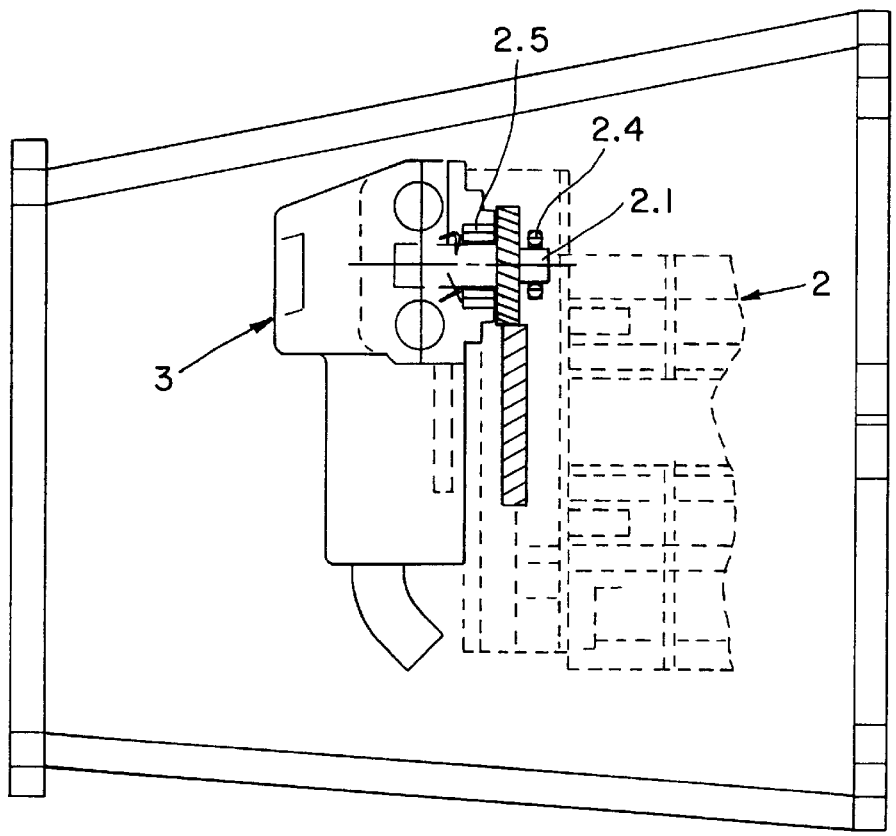
FIG. 2 is an elevational view of a portion of the present invention.

FIG. 2 shows in a partial view the arrangement according to the invention with parts of the transmission 2 illustrated by dashed lines and with the retarder 3. The retarder has a rotor impeller 3.1 and a stator impeller 3.2. The retarder is fitted on a shaft 2.1 which, in turn, is fitted, among others, in an outside wall 14 of the transmission 2. This is shown in greater detail in FIG. 3.

The transmission 2 possesses a housing 2.2 with a cover 2.3 fitted in the housing wall. The cover 2.3 is screw-joined to the remaining wall of the transmission housing 2.2 and sealed against said housing. The retarder shaft 2.1 is supported by means of two bearings 2.4 and 2.5, the bearing 2.4 being contained within the space enclosed by the transmission housing 2.2, while the bearing 2.5 is arranged in the cover 2.3.

Retarder 3 is preassembled as an independent module and is slipped on to the retarder shaft 2.1 from outside. Slip-on of the retarder 3, partially assembled, is also conceivable.

Cover 2.3 features an outer bounding surface 2.6 on which the retarder module 3 is placed. Cover 2.3 also features an inner bounding surface 2.7 fitted in an appropriate recess 16 of the transmission housing 2.2.

Additionally, the cover 2.3 supports a sealing component in the form of a packing 2.8. Packing 2.8 serves a dual function: it seals the annular clearance between cover 2.3 and retarder shaft 2.1, first, with regards to the transmission oil or other lubricant 11 and, second, it provides a seal against the operating medium 10 of the retarder 3 which is a cooling medium in the illustrated embodiment. The packing may be fashioned as a single sealing element or as a double element comprising individual elements 13 having a clearance therebetween.

Also visible is a leakage bore 2.9 in the cover 2.3. Leakage bore 2.9 permits the outside removal of leakage fluid.

Furthermore, the retarder shaft 2.1 supports a pinion 2.10, which is an integral part of a gear-up arrangement for imparting higher rpm to the retarder shaft 2.1.

Figure 3:
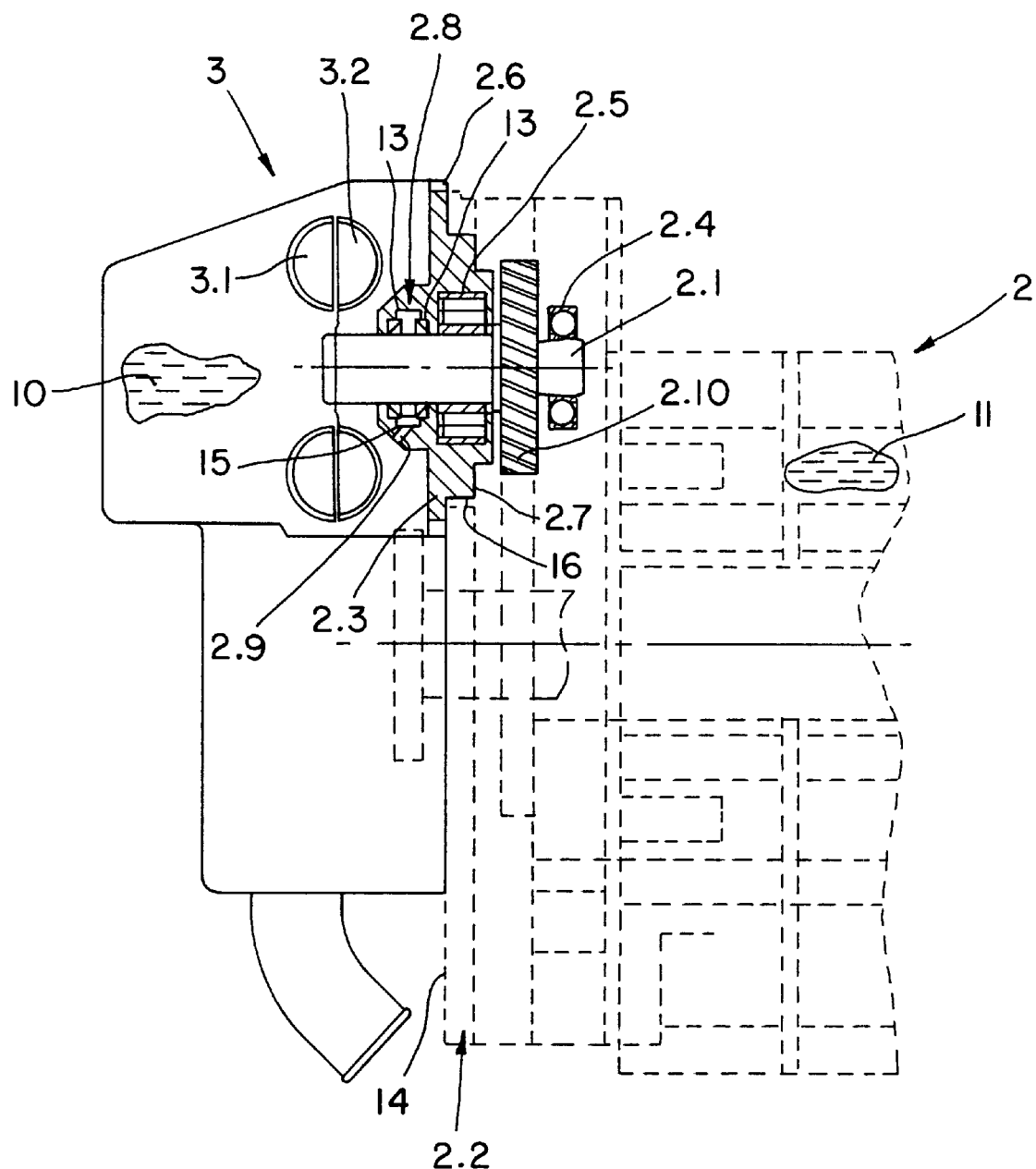
FIG. 3 is an enlarged elevational view similar to FIG. 2.

On the retarder 3, the rotor impeller 3.1 and stator impeller 3.2 may be switched in the axial direction, so that, as opposed to the configuration shown in FIG. 3, the rotor impeller 3.1 is nearer the cover 2.3 than the stator impeller.

The retarder shaft 2.1 may be a hollow shaft.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A drive unit for a motor vehicle having an engine, said drive unit comprising:
    a transmission, said transmission a transmission housing defining an outside wall of said transmission, said housing containing transmission lubricant therein;
    a retarder in the form of an independent module having an operating medium and a cooperatively disposed rotor and stator disposed therein, said retarder module being separate from said transmission housing outside wall;
    a retarder shaft extending through an aperture in said transmission outside wall and protruding freely beyond said outside wall and extending into said retarder module, said shaft having said rotor mounted thereon;
    two bearings rotatably supporting said shaft; and
    a sealing component disposed between said shaft and said outside wall sealing a clearance between said shaft and said outside wall against said transmission lubricant and said operating medium, said transmission lubricant being separated from said operating medium.

2. The drive unit of claim 1 wherein said retarder shaft is a hollow shaft.

3. The drive unit of claim 1 wherein said outside wall comprises a cover joined to a remaining portion of said transmission housing and said outside wall supports one of said retarder and said retarder shaft.

4. The drive unit of claim 3 wherein said retarder shaft is a hollow shaft.

5. The drive unit of claim 3 further comprising a gearing arrangement, said gearing arrangement including a pinion disposed on said retarder shaft.

6. The drive unit of claim 5 wherein said pinion is disposed on said retarder shaft between said two bearings.

7. The drive unit of claim 1 further comprising a gearing arrangement, said gearing arrangement including a pinion disposed on said retarder shaft.

8. The drive unit of claim 7 wherein said pinion is disposed on said retarder shaft between said two bearings.

9. The drive unit of claim 7 wherein said retarder shaft is a hollow shaft.

* * * * *